United States Patent
Lammerant et al.

(10) Patent No.: US 8,522,677 B2
(45) Date of Patent: Sep. 3, 2013

(54) SQUARE BALER WITH AN IMPROVED BALE CHUTE

(75) Inventors: Eddy Lammerant, Koksijde (BE); Marnix J. Schoonheere, Ichtegem (BE); Johan A. E. Vande Ryse, Bruges (BE)

(73) Assignee: CNH America, LLC, New Holland, PA (US)

( * ) Notice: Subject to any disclaimer, the term of this patent is extended or adjusted under 35 U.S.C. 154(b) by 0 days.

(21) Appl. No.: 13/321,160

(22) PCT Filed: May 18, 2010

(86) PCT No.: PCT/EP2010/056830
§ 371 (c)(1),
(2), (4) Date: Feb. 2, 2012

(87) PCT Pub. No.: WO2010/133603
PCT Pub. Date: Nov. 25, 2010

(65) Prior Publication Data
US 2012/0124958 A1    May 24, 2012

(30) Foreign Application Priority Data
May 19, 2009    (BE) .................................. 2009/0314

(51) Int. Cl.
*A01F 15/08*    (2006.01)
*B30B 9/30*    (2006.01)
*B30B 15/32*    (2006.01)

(52) U.S. Cl.
USPC .............................. 100/7; 100/188 R; 56/449

(58) Field of Classification Search
USPC ................... 100/7, 179, 188 R, 218; 56/430, 56/432, 449, 474, 476, 480; 414/24.5, 24.6, 414/111, 525.1, 534
See application file for complete search history.

(56) References Cited

U.S. PATENT DOCUMENTS

| 2,625,002 | A | * | 1/1953 | Prechel ........................... 56/476 |
| 5,540,144 | A | * | 7/1996 | Schrag et al. ............. 100/188 R |
| 6,134,870 | A | * | 10/2000 | Lippens et al. .................. 56/432 |
| 6,478,523 | B1 | * | 11/2002 | Meijer ........................... 414/111 |
| 7,392,644 | B2 | * | 7/2008 | Covington et al. ............... 56/28 |
| 7,584,696 | B2 | * | 9/2009 | Verhaeghe et al. ....... 100/188 R |
| 2008/0141870 | A1 | * | 6/2008 | Verhaeghe et al. ............... 100/7 |

* cited by examiner

*Primary Examiner* — Jimmy T Nguyen
(74) *Attorney, Agent, or Firm* — Patrick M. Sheldrake

(57) ABSTRACT

A square baler comprises a bale chute for lowering completed bales onto the ground, wherein the bale chute has a leading end connected to the rear end of the baler for pivoting movement between a raised transport position and a lowered operating position about an axis transverse to the direction of travel of the baler, and a suspension is provided. The suspension is connected to the baler by way of a lever mechanism that is movable between a first position in which the bale chute is supported in the operating position and a second position in which the bale chute is inclined sufficiently to the horizontal to cause a bale resting on any part of the bale chute to slide under the action of gravity along the bale chute and to fall onto the ground from the trailing end of the bale chute.

8 Claims, 2 Drawing Sheets

SQUARE BALER WITH AN IMPROVED BALE CHUTE

This application is the US National Stage filing of International Application Serial No. PCT/EP2010/056830 filed on May 18, 2010 which claims priority to Belgium Application BE2009/0314 filed May 19, 2009, each of which is incorporated herein by reference in its entirety.

TECHNICAL FIELD

The present invention relates to an agricultural square baler for picking up crop material such as hay or straw from a field and forming it into rectangular bales. More particularly the invention relates to a bale chute located at the rear of the baler for receiving the formed bales and depositing them onto the ground.

BACKGROUND ART

Conventionally, agricultural balers comprise a wheeled frame which is towed by a tractor over a field to pick up hay, straw or silage grass and to feed such crop material to a baling chamber in which it is compressed into a rectangular package under the action of a reciprocating plunger. When each package has reached a predetermined length, a tying mechanism is operated to encircle the package with a plurality of strands so as to form a finished bale, which is subsequently ejected from the baler.

Because the discharge end of the baling chamber is at a substantial height above the ground, there is a risk of bales being damaged by their fall from the baling chamber. For example, the impact may result in breakage of some or all of the strands. Commonly this problem has been solved by providing a guide or slide at the exit of the baling chamber for reducing the height from which the bale is released onto the field and/or giving a wanted orientation to the bale. Such apparatus is termed a bale chute, or a discharge chute, and examples are to be found in WO 96/29195 and EP 0771522.

There are constraints on the level of the bale chute above the field. Sufficient clearance should be provided to prevent contact with the ground when one or both wheels of the baler runs into a hole. On the other hand too high an exit level of the chute makes the impact of the bale too great, such that it may fall apart. Even with reduced heights, problems may occur because the bale starts rotating during its fall and the acquired momentum may rotate the bale further after its edge hits the ground, thereby making the bale tip over and putting it to rest on its front end. The consequent mixture of properly deposited and upright bales on the same field later complicates the handling and collection of the bales.

Consequently, a system is needed to ensure the proper and consistent deposit of the bales, without however exposing the bale chute to increased risks of damage by contact with the ground.

A bale chute that meets these requirements is disclosed in EP 0794260. Here, the bale chute is formed in two portions. A front portion is pivoted to the frame of the baler and a rear portion is pivoted to the rear end of the front portion. The rear portion is movable between an upper, bale sustaining, position and a lower, bale discharging, position. In this way, the bale chute can be lowered during the time interval of the actual discharge operation only. During the remainder of the baling operation, the bale chute is kept at a level sufficiently high to preclude collision with the ground.

The bale chute of EP 0794260 needs to be typically one and a half times as long as a bale. The first part, which is as long as a bale, supports a bale as it leaves the baling chamber and the shorter second part tilts and lowers the bale to the ground. The fact that the bale chute is in two parts enables it to be folded away when the baler is in a transport mode while providing a sufficiently long inclined ramp to lower bales gradually to ground level.

In EP 0794260, the front portion can be pivoted between a vertical stowed position and a lowered position in which it is level with the floor of the baling chamber and only the rear portion can be inclined below this level to discharge a bale onto the ground.

During operation, while crop is being compressed in the baling chamber to form the next bale, the last completed bale is retained in the baling chamber to offer resistance to the reciprocating plunger compressing the next bale. The last completed bale emerges incrementally from the baling chamber and is supported on the front portion of the bale chute. To avoid damage to the emerging bale, the front portion of the chute needs to be retained in line with the baling chamber until the bale in the process of being formed has reached the desired size and the emerging bale has left the baling chamber entirely. This front portion of the chute cannot therefore in normal operation be allowed to tilt below the level of the floor of the baling chamber and it is only the rear portion of the chute that is used to lower the bales onto the ground.

In EP 0794260, the discharging of the completed bales from the bale chute takes place automatically until the last bale in a field. Balers comprise a mechanism for ejecting from baling chamber the last formed bale when no new bale is being produced but the last ejected bale then comes to rest on the front portion of the bale chute because there is no new bale being ejected to push it onto the tilting rear portion of the bale chute.

Hitherto, the lowering of the last bale onto the ground has required intervention by the operator. By reversing the baler and braking abruptly, the last bale could be propelled by its inertia onto the rear portion of the chute. Such reversing of the baler is hazardous and not always successful.

Alternatively, the operator would need to descend from his cabin and push the bale manually along the bale chute but this is inconvenient.

DISCLOSURE OF INVENTION

The present invention seeks to overcome the foregoing disadvantage and to enable the operator of the baler to lower the last formed bale safely onto the ground preferably without leaving the driver cabin.

According to the present invention, there is provided a square baler having a baling chamber within which crop is compressed into a bales and a bale chute for lowering completed bales onto the ground, wherein the bale chute has a leading end connected to the rear end of the baler for pivoting movement between a raised transport position and a lowered operating position about an axis transverse to the direction of travel of the baler, and a suspension is provided between a point on the baler above the transverse pivoting axis of the bale chute and a point on the bale chute distant from the transverse pivoting axis for supporting the bale chute in substantially the same plane as the floor of the baling chamber when in the lowered operating position, characterised in that the suspension is connected to the baler by way of a lever mechanism that is movable between a first position in which the bale chute is supported in the operating position and a second position in which the bale chute is inclined sufficiently to the horizontal to cause a bale resting on any part of the bale chute to slide under the action of gravity along the bale chute and to fall onto the ground from the trailing end of the bale chute.

Preferably, as is already known from EP 0794260, the bale chute has a front portion connected to the rear end of the baler and a rear portion that tilts automatically relative to the front portion under the weight of a bale. In normal operation, the bale chute need not be tilted relative to the baling chamber and bales will automatically be lowered onto the ground by the rear portion. It is only after a last bale is formed, with no bale behind it to push it onto the tilting second portion of the bale chute, that the suspension has to be used to lower the front portion of the bale chute to cause the bale resting on it to slide to the rear under the action of gravity.

It should be mentioned here that terms such as "front", "rear", "forward", "rearward", "left" and "right" used throughout this description are determined with respect to the normal direction of travel of the baler in operation.

To assist in bale collection, it has previously been proposed in GB 724,771 to tilt a bale chute about a fore-aft axis to cause bales to fall on command to one side of the path of travel of the baler. The prior art does not however teach tilting a bale chute about a transverse axis located at the leading end of the bale chute.

The lever mechanism may suitable have a toggle action, with two stable end positions lying one on each side of an unstable over centre position. In this way, it is not necessary to expend energy to maintain the bale chute in either end position and a force is only required to move the bale chute from one stable end position to the other.

The latter force may conveniently be provided by a hydraulic cylinder but is it alternative possible to use an electric motor or a manually operable lever mechanism having a sufficient mechanical advantage.

BRIEF DESCRIPTION OF DRAWINGS

The invention will now be described further, by way of example, with reference to the accompanying drawings, in which.

MODE(S) FOR CARRYING OUT THE INVENTION

Figure 1:
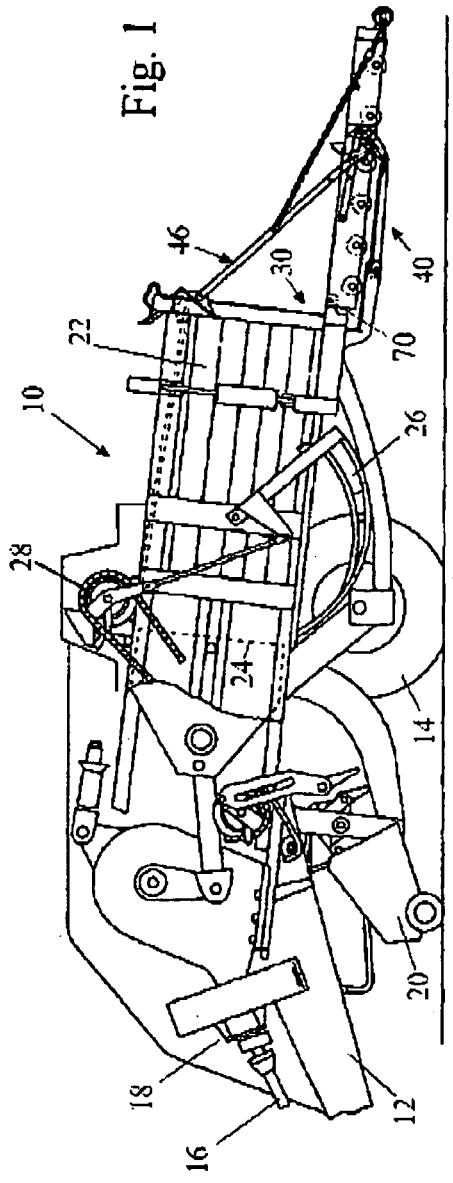
FIG. 1 is a side view of a known square baler.
Figure 2:
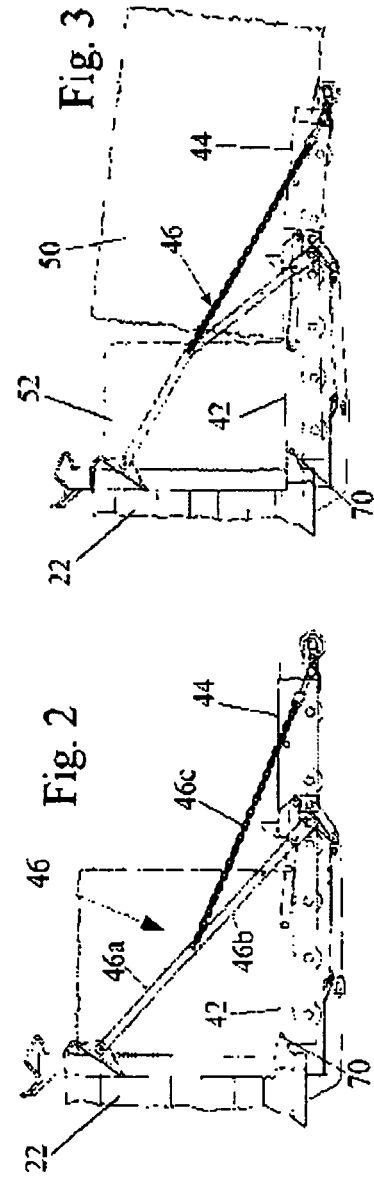
FIGS. 2 and 3 show the bale chute of the baler in FIG. 1 in two different positions.
Figure 3:
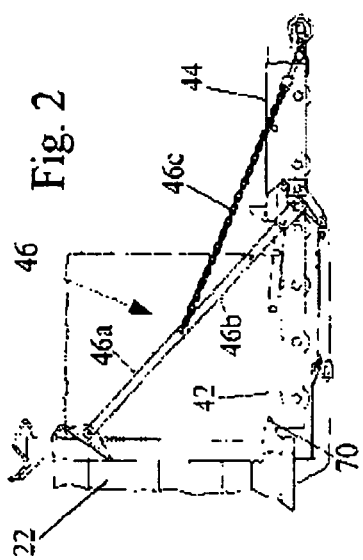

FIGS. 1 to 3 are the same as FIGS. 1 to 3 of EP 0974260 in which they are described fully. In the interest of brevity, the latter specification is imported herein by reference in its entirety and the figures will be described below only to the extent necessary for an understanding of the present invention.

The baler 10 is hitched at its front end 12 to a tractor and is supported on wheels 14. The baler 10 is powered from the power take off shaft of the tractor through an input shaft 16 of a gearbox 18.

Crop lying in a field in windrows is collected from the ground by a pickup 20 and is transferred in individual pre-compressed slices into a baling chamber 22 in which it is compressed further by a constantly reciprocating plunger 24. When the compressed crop package in the baling chamber reaches the desired length, needles 26 and knotters 28 tie strands around the package to form a bale. The completed bale remains in the baling chamber 22 and is incrementally pushed out of the rear end 30 of the baling chamber 22 by the action of the plunger 24 as the next bale is being formed.

The rear end 30 of the baler is high off the ground and if bales were to be dropped from that height onto the ground they would be damaged. A bale chute 40 is used to lower bales onto the ground. The bale chute is formed of a front portion 42, pivotable to the rear end 30 of the baler 10 about an axis 70 transverse to the direction of travel of the baler 10 and a rear portion 44 pivotable to the rear end of the front portion 42.

The pivoting of the front portion 42 is to allow the bale chute to be stowed in a vertical transport position. In the operating position shown in FIGS. 2 and 3, the rear portion is supported by a suspension 46, made up of two rigid links 46a and 46b and a flexible chain link 46c, level with the floor of the baling chamber 22.

The rear portion 44 can tilt under the weight of a bale from the position shown in FIG. 2 to that shown in FIG. 3. This allows the last bale 50 to slide along the rear portion 44 under the action of gravity without being pushed by the next bale 52 and to drop onto the ground in a particular orientation.

So long as bales are being formed, the bale supported on the front chute portion 42 will be pushed incrementally onto the rear chute portion 44 until the point is reached where the latter portion tilts and causes the bale to slide onto the ground. However, a difficulty arises on completion of the baling operation in a field.

When there is no more crop to be baled, the last completed bale remains at the rear end of the baler. A reciprocating ejector mechanism is provided in the floor of the baling chamber 22 to push the last bale out of the baling chamber onto the front portion 42 of the bale chute. However, there is no mechanism in the bale chute to push it onto the rear portion 44 from which it would fall automatically onto the ground and driver intervention as mentioned above is needed.

Figure 4:
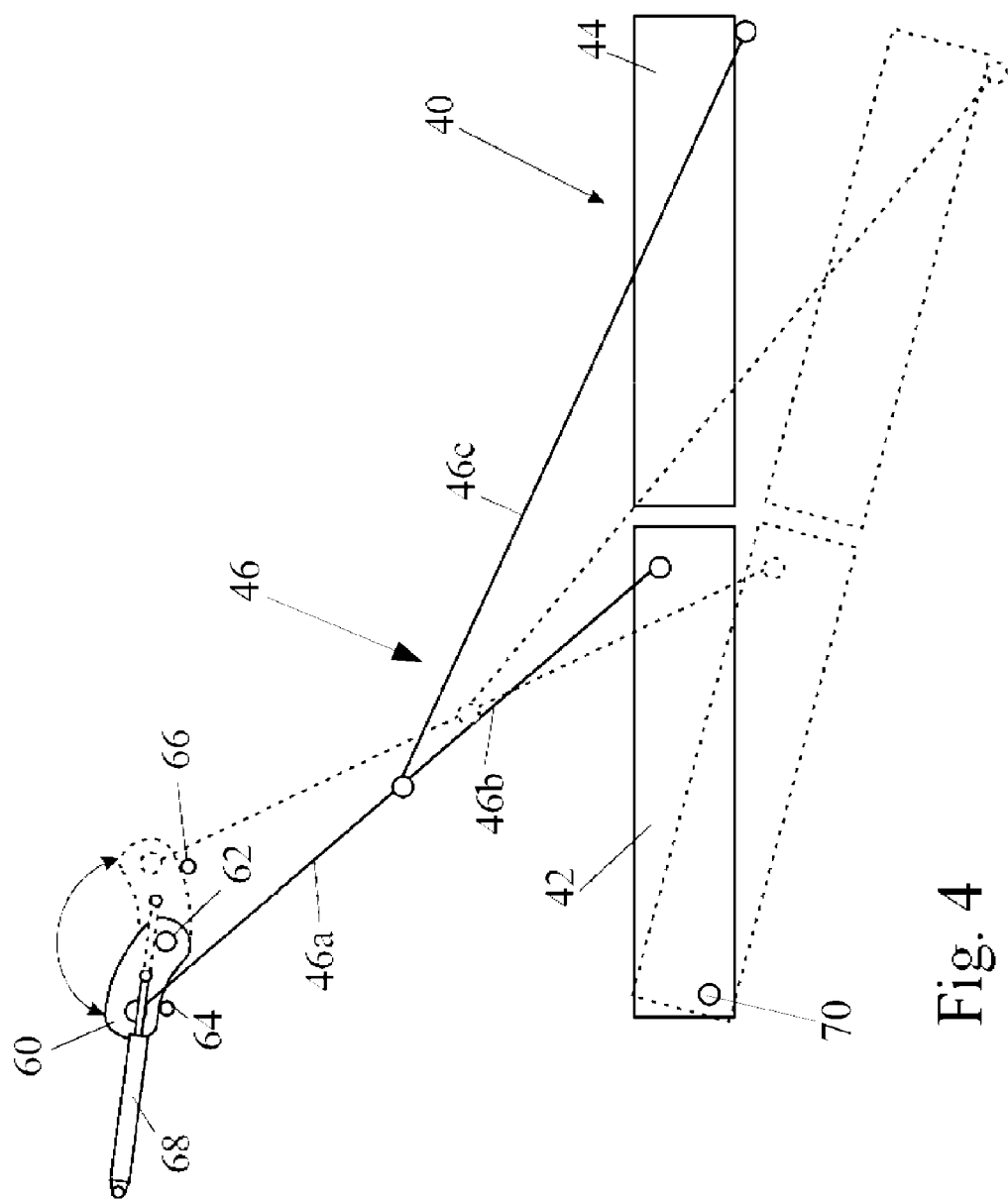
FIG. 4 shows schematically a modification in accordance with the present invention of the baler shown in FIGS. 1 to 3.

To overcome this problem, in the present invention a modification is made as shown in FIG. 4 to the attachment between suspension 46 and the baler 10. Instead of the upper end of the link 46a being connected to a bracket fixed to the baler 10 near the top of the baling chamber 22, it is connected to a lever 60 that can pivot about a pin 62 that is fixed to the baler 10 near the top of the baling chamber 22. The lever 60 has two end positions defined by stops 64 and 66 which are also fixed to the baler 10 near the pin 62. The position of the lever 60 shown in solid lines in which it rests on the stop 64 is that adopted during normal operation. In this position, the bale chute 40 and the suspension 46 adopt their normal operations as described above, which are also shown in solid lines.

When the last bale from a field is to be lowered to the ground without being pushed from behind, the lever 60 is moved by an actuator 68, which is connected at one end to the lever 60 and at its other end to the baler 10, to the position shown in dotted lines in which it rests against the stop 66. This movement results in the suspension 46 and the bale chute 40 adopting the inclined position shown in dotted lines in FIG. 4. In this position, any bale resting on the front portion 42 will slide under the action of gravity onto the rear portion 44 which will tilt further and gently lower the bale to the ground without damage and without the need for the operator to leave the driver's cabin.

While the actuator 68 is shown as being a remotely controlled hydraulic jack, it will be clear that an electric motor or a manually operated linkage could alternatively be employed to operate the lever 60.

The toggle action of the lever 60 stems from the fact that the line of action of the suspension 46 crosses the pin 62 that forms a pivot point during the movement of the lever 60 from one end position to the other. It is important, however, that the line of action of the actuator on the other hand should always remain on the same side of the pivot pin 62, to avoid locking the lever 60 in one end position.

The invention as defined in the claims is of course not limited to the exemplary embodiments as described and shown in the drawings, but can equally comprise combinations and alternatives that fall within the scope of the claims.

The invention claimed is:

1. A square baler comprising:
    a baling chamber within which crop is compressed into a bales; and a bale chute for lowering completed bales onto the ground, wherein the bale chute has a leading end connected to the rear end of the baler for pivoting movement between a raised transport position and a lowered operating position about an axis transverse to a direction of travel of the baler,
    a suspension spanning between a point on the baler above the transverse pivoting axis of the bale chute and a point on the bale chute distant from the transverse pivoting axis supporting the bale chute in substantially the same plane as a floor of the baling chamber when in the lowered operating position, and
    a lever mechanism connecting an end of the suspension to the baler, the lever mechanism positioned above the transverse pivoting axis of the bale chute, and the lever mechanism movable between a first position in which the bale chute is supported in the lowered operating position and a second position in which the bale chute is inclined from the lowered operating position to cause a bale resting on any part of the bale chute to slide under an action of gravity along the bale chute and to fall onto the ground from the trailing end of the bale chute.

2. A square baler according to claim 1, wherein the bale chute has a front portion connected to the rear end of the baler and a pivotal rear portion that tilts automatically relative to and separately from the front portion under the weight of a bale when the lever mechanism is in the first position.

3. A square baler according to claim 1, wherein the lever mechanism has a toggle action, with two stable end positions lying one on each side of an unstable over centre position.

4. A square baler according to claim 1, wherein the lever mechanism is movable between its end positions by an actuator.

5. A square baler according to claim 1, wherein the lever mechanism includes a lever having first and second end positions and having a pivotal connection with the baler, the suspension connected to the lever such that when the lever is in a first end position the chute is in the operating position and when the lever mechanism is rotated to the second end position the suspension and the chute are rotated therewith to an inclined position.

6. A square baler according to claim 5, wherein a line of action of the suspension on the lever crosses the pivotal connection of the lever during the movement of the lever between the end positions.

7. A square baler according to claim 4, wherein a line of action of the actuator on the lever mechanism remains on the same side of a pivotal connection of the lever mechanism to the baler.

8. A square baler according to claim 5, wherein the two end positions are defined by stops connected to the baler wherein an end of the lever contacts the first stop in the operating position and the second stop when in the inclined position.

* * * * *